(12) United States Patent
Colvonen

(10) Patent No.: US 11,901,664 B2
(45) Date of Patent: Feb. 13, 2024

(54) SAFETY PLUG ASSEMBLIES FOR ELECTRICAL OUTLETS

(71) Applicant: Peter J. Colvonen, San Diego, CA (US)

(72) Inventor: Peter J. Colvonen, San Diego, CA (US)

(73) Assignee: Besvin, Inc., San Diego, CA (US)

( * ) Notice: Subject to any disclaimer, the term of this patent is extended or adjusted under 35 U.S.C. 154(b) by 99 days.

(21) Appl. No.: 17/502,325

(22) Filed: Oct. 15, 2021

(65) Prior Publication Data

US 2022/0037826 A1 Feb. 3, 2022

Related U.S. Application Data

(63) Continuation-in-part of application No. PCT/US2020/029474, filed on Apr. 23, 2020.

(60) Provisional application No. 63/093,108, filed on Oct. 16, 2020, provisional application No. 62/839,872, filed on Apr. 29, 2019.

(51) Int. Cl.
*H01R 13/44* (2006.01)
*H01R 13/443* (2006.01)

(52) U.S. Cl.
CPC .................. *H01R 13/443* (2013.01)

(58) Field of Classification Search
None
See application file for complete search history.

(56) References Cited

U.S. PATENT DOCUMENTS

| 3,876,273 | A | | 4/1975 | Schwartz |
| 4,408,813 | A | | 10/1983 | Koehler |
| 5,017,148 | A | | 5/1991 | Buckshaw |
| 5,236,369 | A | * | 8/1993 | Beach ................. H01R 13/443 |
| | | | | 174/67 |
| 5,238,416 | A | | 8/1993 | Dickie |
| D351,373 | S | | 10/1994 | Barton |

(Continued)

FOREIGN PATENT DOCUMENTS

| CN | 205159584 U | 4/2016 |
| KR | 20-0428001 Y1 | 10/2006 |
| KR | 20-0486875 Y1 | 7/2018 |

OTHER PUBLICATIONS

International Application No. PCT/US2020/029474 International Search Report and Written Opinion dated Aug. 12, 2020 (11 pages).

(Continued)

*Primary Examiner* — Ross N Gushi
(74) *Attorney, Agent, or Firm* — Conley Rose, P.C.

(57) ABSTRACT

A safety plug assembly includes a connector configured to be inserted behind a front plate of an electrical outlet. The connector comprises a first body member including a central axis, a first side, and a second side radially opposite the first side with respect to the central axis. The first body member includes a ramped surface that extends from the first side to an abutment surface. A thickness of the first body member tapers when moving along the ramped surface from the abutment surface toward the first side. In addition, the safety plug assembly includes a safety plug coupled to the connector. The safety plug comprises a plug member that is configured to be inserted within a contact opening of the electrical outlet.

19 Claims, 15 Drawing Sheets

(56) References Cited

U.S. PATENT DOCUMENTS

| | | |
|---|---|---|
| D764,417 S | 8/2016 | Siller |
| 9,705,230 B2 | 7/2017 | Siller et al. |
| 2014/0113468 A1 | 4/2014 | McBane |

OTHER PUBLICATIONS

1 CN First Office Action dated Sep. 14, 2023, for Application No. CN202080029877.7, and English summary.

\* cited by examiner

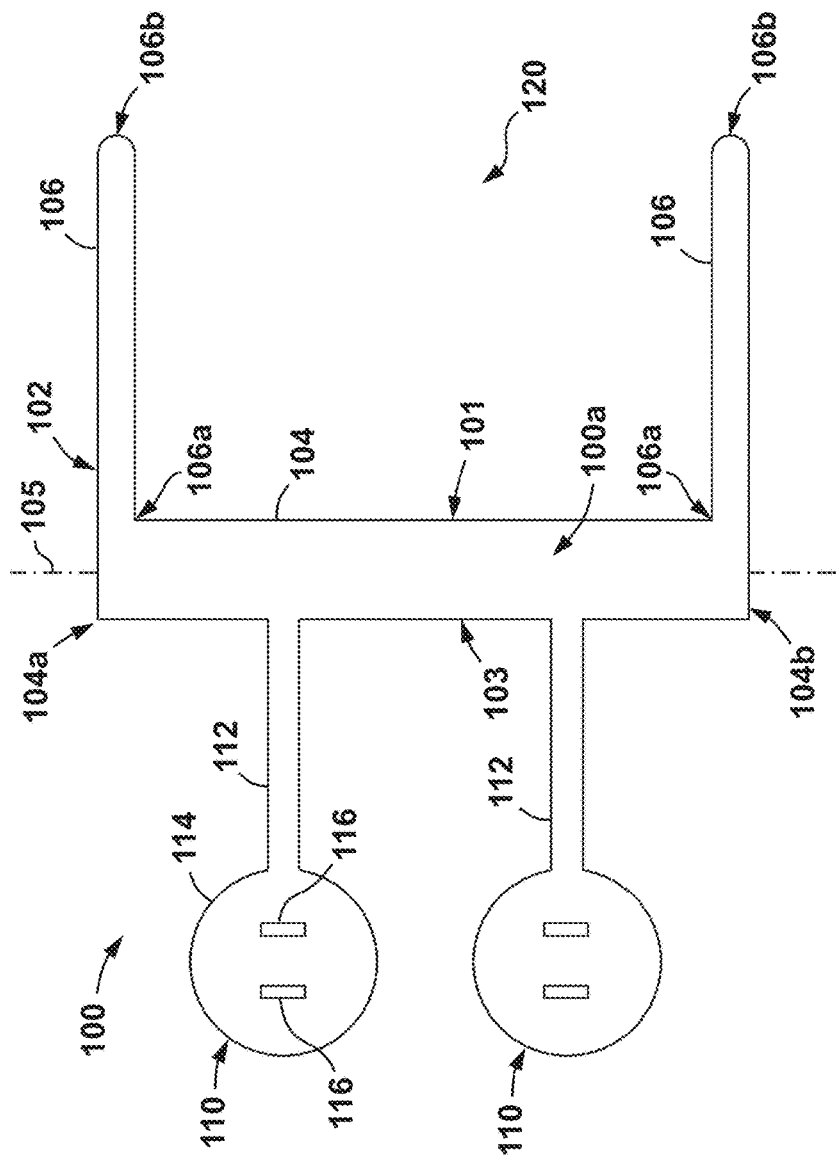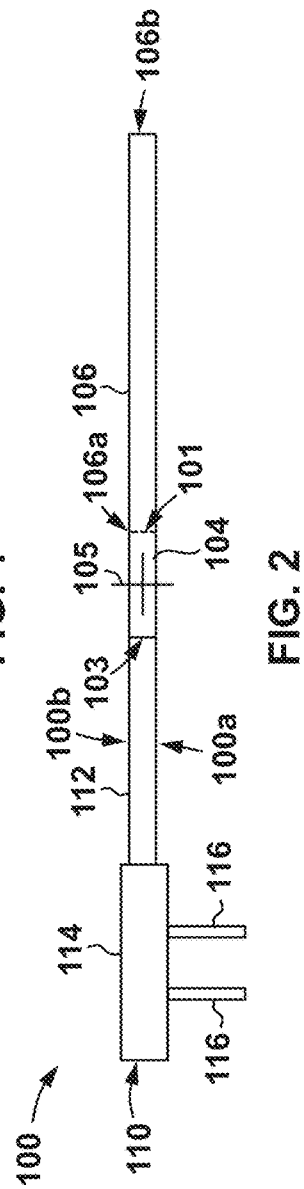

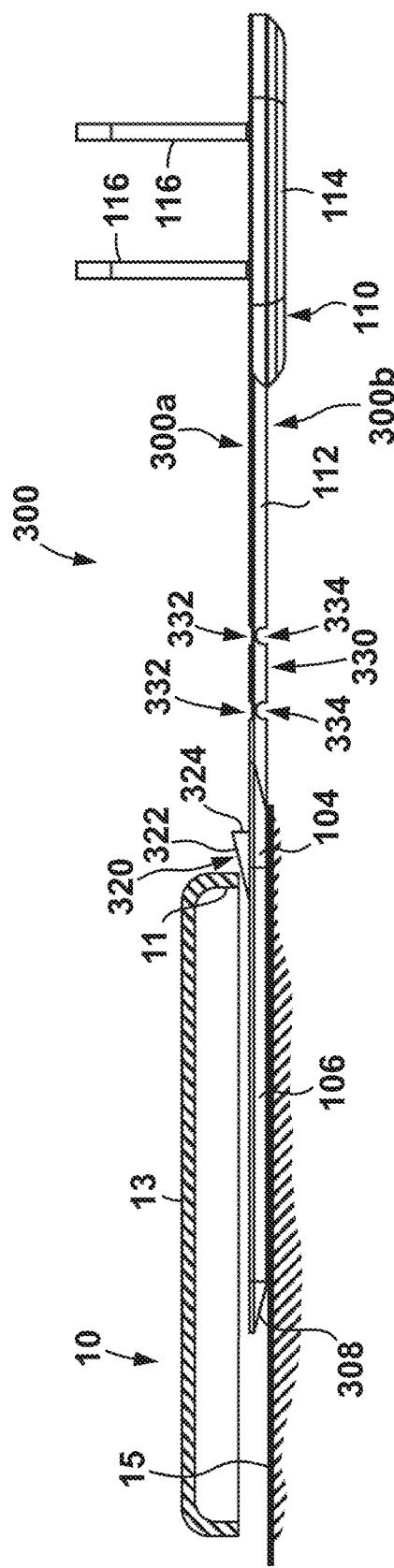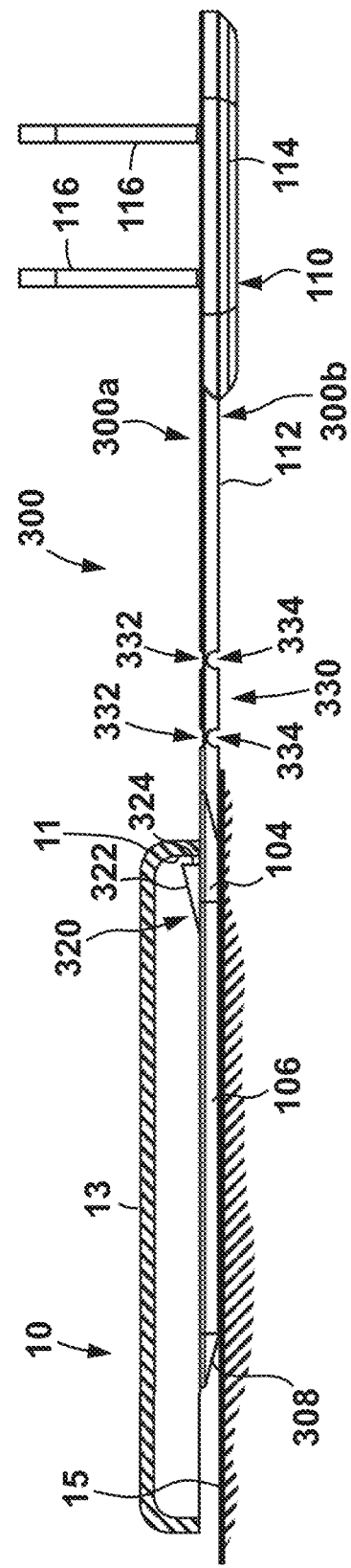
FIG. 13
FIG. 14

SAFETY PLUG ASSEMBLIES FOR ELECTRICAL OUTLETS

CROSS-REFERENCE TO RELATED APPLICATIONS

The present application is a continuation-in-part of PCT/US2020/029474, filed Apr. 23, 2020, titled "Safety Plug Assemblies for Electrical Outlets," which claims priority to U.S. Provisional Patent Application No. 62/839,872, filed Apr. 29, 2019, titled "Safety Plug Assemblies for Electrical Outlets." In addition, the present application claims priority to U.S. Provisional Patent Application No. 63/093,108, filed Oct. 16, 2020, titled "Safety Plug Assemblies for Electrical Outlets." The contents of each of these applications is incorporated herein by reference in their entireties.

BACKGROUND

Electrical outlets are utilized within both residential and commercial structures to provide electrical power to various devices. In some circumstances (e.g., such as within a residential structure occupied by children), un-used electrical outlets may be covered with an appropriate safety cover or plug to prevent or reduce the risk of electric shock.

BRIEF SUMMARY

Some embodiments disclosed herein are directed to a safety plug assembly. In an embodiment, the safety plug assembly includes a connector configured to be inserted behind a front plate of an electrical outlet. The connector comprises a first body member including a central axis, a first side, and a second side radially opposite the first side with respect to the central axis. The first body member includes a ramped surface that extends from the first side to an abutment surface, and a thickness of the first body member tapers when moving along the ramped surface from the abutment surface toward the first side. In addition the safety plug assembly includes a safety plug coupled to the connector. The safety plug comprises a plug member that is configured to be inserted within a contact opening of the electrical outlet.

In another embodiment, the safety plug assembly includes a connector comprising a central axis and a receptacle disposed on a first side of the central axis. The connector is configured to be inserted behind a front plate of an electrical outlet such that an outlet connector of the electrical outlet is received within the receptacle along a radial direction with respect to the central axis. In addition, the safety plug assembly includes an arm extending from the connector on a second side of the central axis that is opposite the first side. Further, the safety plug assembly includes a safety plug coupled to the arm. The safety plug includes a plug member that is configured to be inserted within a contact opening of the outlet connector.

Other embodiments disclosed herein are directed to a method. In an embodiment, the method includes (a) loosening a mounting screw extending through the front plate of an electrical outlet that is installed along a surface such that the front plate is not fully removed from the electrical outlet. In addition, the method includes (b) inserting a connector of a safety plug assembly between the surface and the front plate after (a), and (c) receiving an outlet connector of an electrical outlet into receptacle of the connector during (b). Further, the method includes (d) tightening the mounting screw of the front plate, and (e) compressing the connector with the front plate during (d). Still further, the method includes (f) inserting a safety plug into a contact opening of the outlet connector after (d), wherein the safety plug is coupled to an arm that extends from the connector.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various embodiments, reference will now be made to the accompanying drawings in which:

FIG. 1 is a front view of a safety plug assembly according to some embodiments;

FIG. 2 is a top view of the safety plug assembly of FIG. 1 according to some embodiments;

FIGS. 13 and 14 are sequential top views of the safety plug assembly of FIG. 9 being inserted between a front cover and support surface of an electrical outlet according to some embodiments;

DETAILED DESCRIPTION

Figure 3:
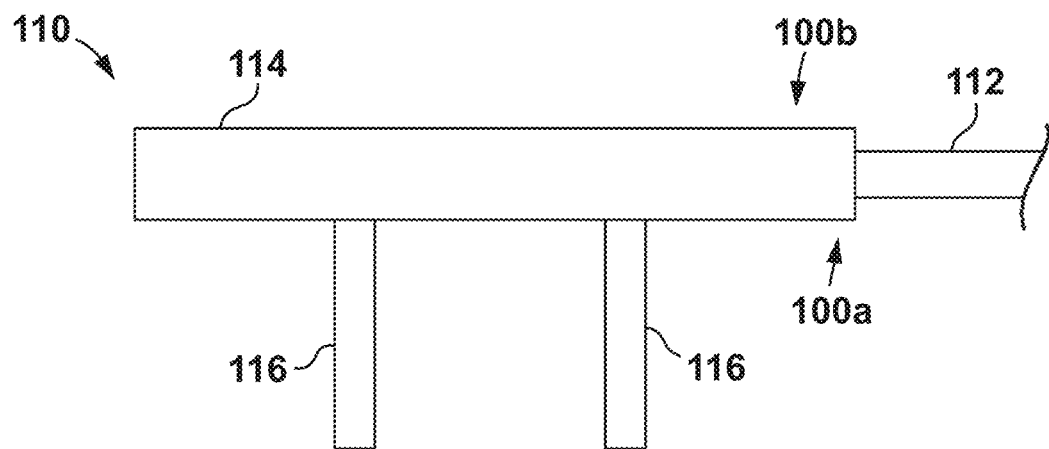
FIG. 3 is an enlarged top view of one of the safety plugs of the safety plug assembly of FIG. 1 according to some embodiments.

The following discussion is directed to various embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As previously described, un-used electrical outlets may be covered with an appropriate safety cover or plug (generally referred to herein as "safety plugs") to prevent or reduce the risk of electric shock. For instance, such safety plugs are used to protect against the insertion of objects into the electrical connectors of an electrical outlet. In order to use the electrical outlet, one would first remove any safety plugs installed therein and then insert an electrical plug (e.g., for an electrically operated device or appliance). However, once use of the electrical outlet is ceased, one might forget to reinsert the safety plug. Also, in some circumstances, the individual who removed the safety plug to access the electrical outlet may misplace the safety plug such that subsequent re-installation of the safety plug into the electrical outlet is prevented.

Accordingly, embodiments disclosed herein include safety plug assemblies for an electrical outlet (and methods related thereto) that allow the safety plugs to remain coupled to the electrical outlet (e.g., via the face plate, the adjacent wall, etc.) even when the safety plug is not inserted within the electrical connector of the electrical outlet. Thus, through use of the embodiments disclosed herein, the chances that a safety plug will not be reinstalled into an electrical outlet following use thereof are reduced.

Referring now to FIGS. 1 and 2, a safety plug assembly 100 according to some embodiments is shown. As will be described in more detail below, safety plug assembly 100 is configured to be secured to an electrical outlet (see e.g., electrical outlet 10 in FIG. 4). Generally speaking, safety plug assembly 100 includes a connector 102 and a plurality of safety plugs 110 coupled to the connector 102. As is best shown in FIG. 2, safety plug assembly 100 also includes a first or front side 100a and a second or back side 100b opposite the front side 100a.

Connector 102 comprises a first body member 104 including a central axis 105, and a pair of second body members 106 extending from the first body member 104. In this embodiment, first body member 104 includes a first or top end 104a, and a second or bottom end 104b opposite and spaced from the top end 104a along axis 105. In addition, first body member 104 includes a first side 101 and a second side 103 radially opposite the first side 101 about the central axis 105. In the front side view of FIG. 1, the first side 101 is a right side of the first body member 104, and the second side 103 is a left side of the first body member 104.

Both of the second body members 106 extend radially outward (with respect to the central axis 105) from the first side 101 of first body member 104. In particular, each of the second body members 106 includes a first or proximal end 106a, a second or distal end 106b opposite the proximal end 106a. Second body members 106 each are mounted to the first side 101 of the first body member 104 at proximal ends 106a such that the distal ends 106b are spaced from the first body member 104 in a radial direction with respect to axis 105.

In addition, the second body members 106 are axially spaced from one another along the axis 105. In particular, in this embodiment one of the second body members 106 extends from first side 101 of first body member 104 at (or proximate to) top end 104a, and the other of the second body members 106 extends from first body member 104 at (or proximate to) bottom end 104b.

As best shown in FIG. 1, the first side 101 of first body member 104 and the second body members 106 together define a receptacle 120. Receptacle 120 is open along one side, between the distal ends 106b of second body member 106. As will be described in more detail below, the receptacle 120 is configured to receive one or more outlet connectors of an electrical outlet therein, when the safety plug assembly is coupled to the electrical outlet during operations.

Referring now to FIGS. 1-3, each of the safety plugs 110 includes a head 114 and a plurality of plug members (or extensions) 116 extending from head 114. Each of the plug members 116 extends from head on the front side 100a of safety plug assembly 100.

In this embodiment, there are two plug members 116 extending from the head 114 of each safety plug 110; however, the number, arrangement, and/or shape of the plug members 116 may be greatly varied in other embodiments. More particularly, the size, shape, arrangement of plug members 116 may be set based on the size, shape, arrangement, etc. of the contact openings of an electrical outlet (e.g., contact openings 14 shown in FIG. 4 and discussed below). Therefore, in various embodiments, the plug members 116 are arranged and designed such that the safety plugs 110 (namely the plug members 116) correspond and therefore engage with the contact openings of a given electrical outlet.

The head 114 of each safety plug 110 is coupled to first body member 104 of connector 102 via a corresponding elongate arm 112. Specifically, in some embodiments, each of the elongate arms 112 extend (e.g., radially) from second side 103 of first body member 104. In this embodiment, arm 112 may have the same thickness as connector 102 (including first body member 104 and second body members 106). In addition, as is best shown in FIGS. 2 and 3, in this embodiment, base 114 has a greater thickness than the corresponding arm 112; however, in other embodiments, head 114 may the same thickness as the corresponding arm 112.

Referring still to FIGS. 1-3, in this embodiment, the connector 102 (including the body members 104, 106), safety plugs 110, and arms 112 may all be monolithically formed as a single piece, monolithic body. In addition, in some embodiments connector 102, safety plugs 110, and/or arms 112 may be formed from a dielectric material (e.g., plastic, rubber, etc.). In some embodiments, only some of the components of safety plug assembly 100 (e.g., safety plugs 110) may be constructed from a dielectric material. In addition, in this embodiment, body members 104, 106 of connector 102 may all lie within the same plane (e.g., an axially oriented plane that includes the central axis 105). Further, the material(s) making up safety plug assembly 100 (or at least some parts thereof) may be flexible, such that safety plug assembly 100 (or at least some parts thereof) may be elastically deformed (e.g., folded, rolled, etc.) without resulting in damage thereto. In particular, in this embodiment, arms 112 are flexible such that they may be freely rolled, folded, or otherwise deformed during operations to connect and disconnect safety plugs 110 from corresponding connectors of an electrical outlet. Also, safety plug assembly 100 may be transparent (or substantially transparent), opaque, or translucent in various embodiments. Safety plug assembly 100 may be any suitable color(s) or shade(s) in various embodiments (e.g., to match or correspond with the color or shade of the wall 15, electrical outlet 10, etc.).

In addition, the safety plug assembly 100 may be manufactured via a variety of different methods. For instance, in some embodiments, safety plug assembly 100 may be manufactured via a pressing, molding (e.g., injection molding, press molding, etc.), additive manufacturing (e.g., three dimensional—3D—printing), stamping, cutting, etc.

Figure 4:
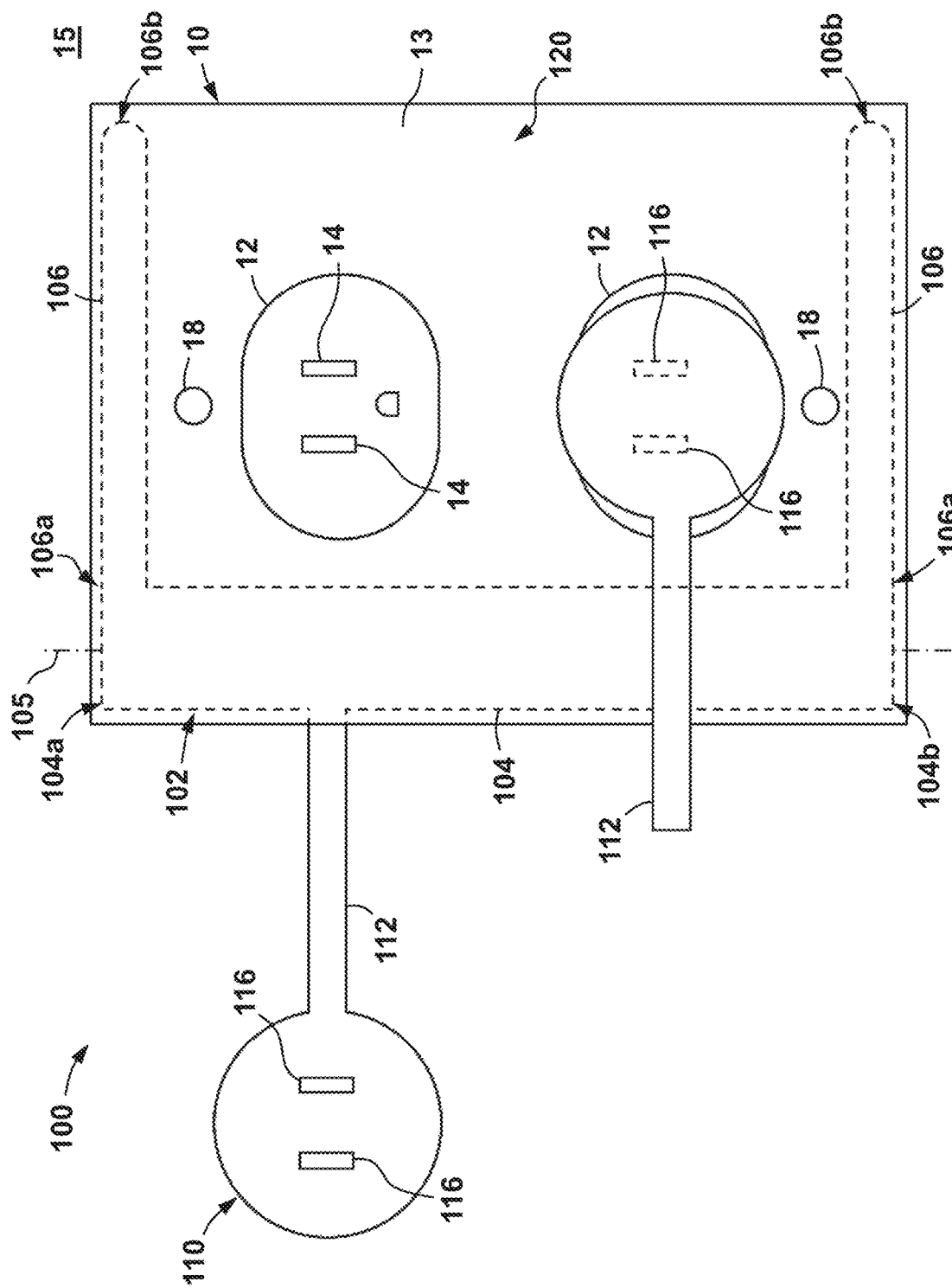
FIG. 4 is a front view of the safety plug assembly of FIG. 1 coupled to an electrical outlet according to some embodiments.
Figure 5:
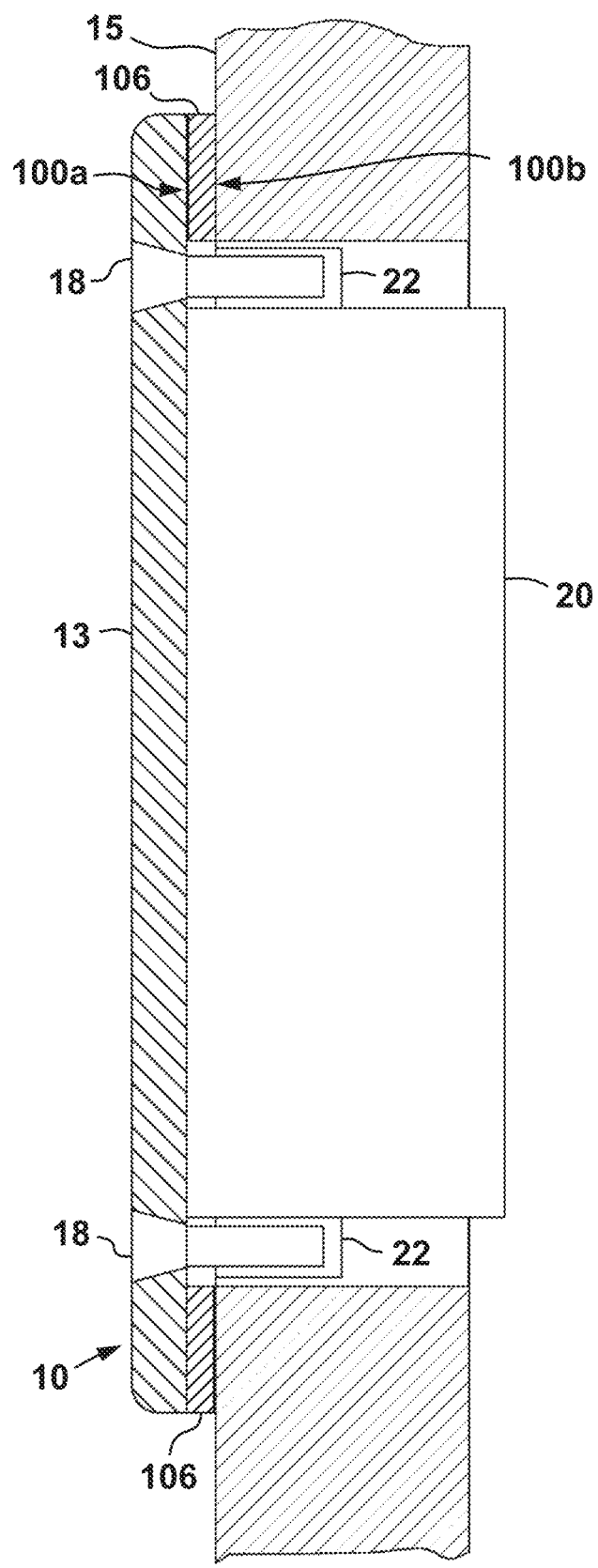
FIG. 5 is a side cross-sectional view of the safety plug assembly of FIG. 1 coupled to an electrical outlet according to some embodiments.

Referring now to FIGS. 4 and 5, during operations, safety plug assembly 100 is coupled to an electrical outlet 10 that is mounted to a support surface 15. Support surface 15 may comprise any suitable surface for supporting an electrical outlet. For example, in some embodiments support surface 15 may comprise a wall of a structure, a backsplash, a side of a cabinet, a base board, etc., and may be more simply referred to herein as "wall 15."

Electrical outlet 10 includes a plurality of outlet connectors 12, each including a plurality of contact openings 14 that provide access to an electrical contact (not shown) which may be further coupled to a source of electricity. One or more (e.g., two in this embodiment) mounting screws 18 are inserted through front plate 13 and threadably engaged within corresponding receptacles 22 coupled to electrical outlet 10 (or to an electrical junction box 20 disposed within wall 15) to mount front plate 13 to wall 15. In this embodiment, mounting screws 18 are disposed proximate a top and bottom of the front plate 13; however, in other embodiments, mounting screws 18 may be disposed on other locations of front plate 13. For instance, in some embodiments, a single mounting screw 18 may be disposed at a central location of front plate 13, between electrical connectors 12.

As shown in FIGS. 4 and 5, during operations mounting screws 18 are loosened such that front plate 13 may be spaced from wall 15. Thereafter, connector 102 (including body members 104, 106) is slipped or inserted between front plate 13 of electrical outlet 10 and wall 15. As can be appreciated in FIGS. 4 and 5, the shape and arrangement of connector 102 allows body members 104, 106 to be inserted between wall 15 and front plate 13 without interfering or overlapping with mounting screws 18, outlet connectors 12, junction box 20, and/or other components of electrical outlet 10 that are disposed behind front plate 13. In particular, the outlet connectors 12 may be received within the receptacle 120 formed by first body member 104 and second body members 106 of connector 102. As best shown in FIG. 4, the outlet connectors 12 are received into the receptacle 120, through the opening formed between the distal ends 106b of second body members 106 along a generally radially oriented direction with respect to axis 105. Once connector 102 is positioned between front plate 13 and wall 15 as described, mounting screws 18 may be re-tightened so as to capture and compress connector 102 (including first body member 104 and/or second body members 106) between front plate 13 and wall 15. In particular, as shown in FIG. 5, connector 102 is engaged with (e.g., partially, wholly, etc.) with the front plate 13 of electrical outlet 10 along front side 100a of safety plug assembly 100, and connector 102 is engaged (e.g., partially, wholly, etc.) with the wall 15 along back side 100b of safety plug assembly 100.

Thus, in some embodiments connector 102 may be inserted between front plate 13 and wall 15 without completely removing mounting screws 18 from receptacles 22 and therefore without entirely removing front plate 13 from outlet 10. However, it should be appreciated that in some embodiments mounting screws 18 may be completely disengaged from receptacles 22 and front plate 13 may be removed from wall 15 so as to allow positioning of connector 102 during operations.

Referring specifically to FIG. 4, once connector 102 of safety plug assembly 100 is secured and captured between front plate 13 and wall 15, safety plugs 110 may be selectively coupled or engaged with outlet connectors 12. In particular, plug members 116 on each safety plug 110 may be inserted within the contact openings 14 on a corresponding one of the outlet connectors 12. As the safety plugs 110 are maneuvered to engage plug members 116 with contact openings 14, arms 112 may elastically bend, roll, or otherwise deform to accommodate the movement of safety plugs 110. In this embodiment, the contact friction between plug members 116 and contact openings 14 is sufficient to prevent undesired disengagement of safety plugs 110 from connectors 12 during operations. In addition, because safety plug assembly 100 (including safety plugs 110, connector 102, and arms 112) are constructed from a dielectric material (e.g., plastic), electrical current is not conducted through safety plug assembly 100, even when plug members 116 are inserted within contact openings 14 as described above.

Thereafter, if access to one or both of the outlet connectors 12 is desired (e.g., such as to plug in an appliance or other electrical device), the safety plugs 110 (or at least one thereof) may be disengaged from the outlet connectors 12 thereby exposing contact openings 14. Because safety plugs 110 are secured to connector 102 via arms 112, and connector 102 is captured between front plate 13 and wall 15 as previously described, once safety plugs 110 are disengaged from electrical connectors 12, they may be supported and suspended adjacent electrical outlet 10 via arms 112. Thus, when use of electrical connectors 12 is no longer desired, safety plugs 110 are positioned adjacent to electrical outlet 10 such that they are prevented from being misplaced and are more likely to be re-engaged with electrical connectors 12.

Figure 6:
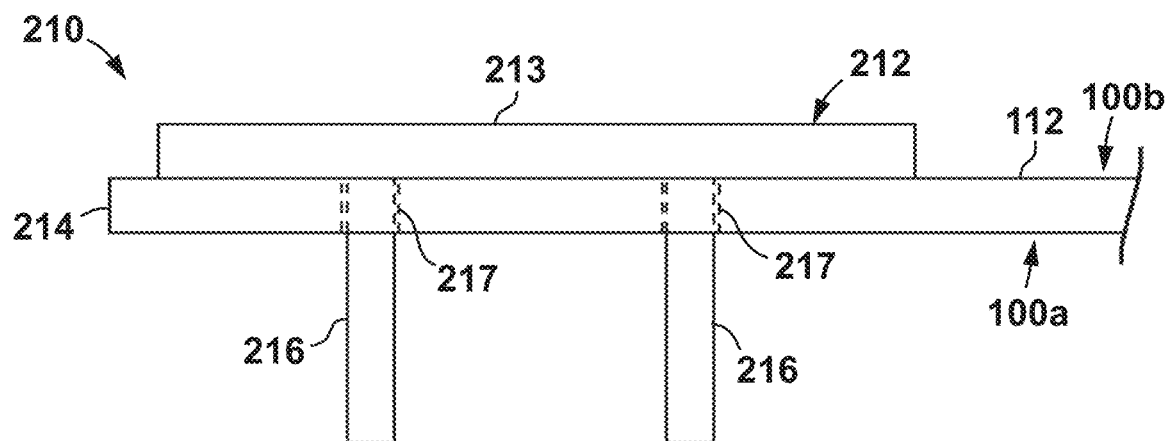
FIG. 6 is a top view of a safety plug of a safety plug assembly according to some embodiments.
Figure 7:
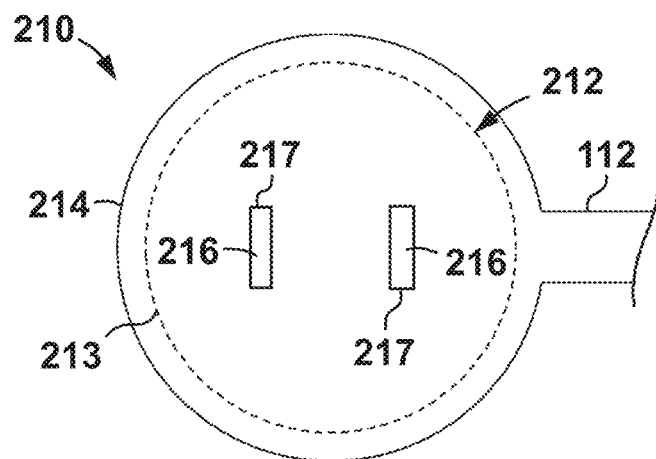
FIG. 7 is a front view of the safety plug of FIG. 6 according to some embodiments.

Referring briefly to FIGS. 6 and 7, in some embodiments, some or all of the safety plugs 110 on safety plug assembly 100 may be replaced with safety plug 210. Safety plug 210 is similar, in some respects, to safety plugs 110, previously described. Thus, like features are described with the same reference numerals and the discussion below will focus on the features of safety plug 210 that are different from safety plug 110, previously described. In particular, in this embodiment, safety plug 210 comprises a head 214 in place of head 114. In this embodiment, head 214 is integrally or monolithically mounted to the corresponding arm 112, such as described above for head 114 (see e.g., FIG. 2). In addition, in this embodiment, head 214 has the same thickness as arm 112 (which in turn has the same thickness of body members 104, 106 of connector 102). However, in some embodiments head 214 may have a greater or lesser thickness than the corresponding arm 112. Further, head 214 includes a plurality (two in this embodiment) of slots or apertures 217 extending therethrough.

In addition, safety plug 210 includes a separate plug 212 that includes a base 213 and a plurality of plug members 216 (which are generally the same as plug members 116, previously described) extending from the base 213. Plug 212 may be a commercially available safety plug for engagement with a corresponding electrical outlet (e.g., outlet 10).

During operations, plug 212 is installed onto head 214 of safety plug 210 by aligning and inserting the plug members 216 through apertures 217 until base 213 is engaged with head 214 along back side 100b (e.g., as shown in FIG. 6). Accordingly, the number, arrangement, size, shape, etc. of apertures 217 may be chosen so as to correspond with the number, arrangement, size, shape, etc. of plug members 116. Once safety plugs 212 are installed onto head 214, operations with safety plugs 210 are the same as those described above for safety plugs 110, and thus, a detailed description of these operations is not provided in the interest of brevity. However, during these operations, it should be appreciated that if one or both of the plug members 216 is damaged or severed (or if plug 212 is lost), a new plug 212 may be installed onto head 214 of safety plug 210 in the manner described above.

As previously described above and generally shown in FIGS. 1 and 4, the connector 102 of safety plug assembly 100 may form an open receptacle 120 such that the electrical connectors 12 of electrical outlet 10 may be inserted into receptacle 120 in a radial direction with respect to axis 105 and the front plate 13 of electrical outlet 10 may merely be loosened and not removed when installing connector 102 between front plate 13 and wall 15 during operations. However, in other embodiments, the connector 102 may define a fully enclosed (or closed) receptacle that is to receive the electrical connectors 12 during operations. Without being limited to this or any other theory, by receiving the electrical connectors 12 within a fully enclosed receptacle, the safety plug assembly 100 may be more securely engaged with the electrical outlet 10, so that accidental or unintentional removal of the safety plug assembly 100 from the electrical outlet 10 is prevented.

Figure 8:
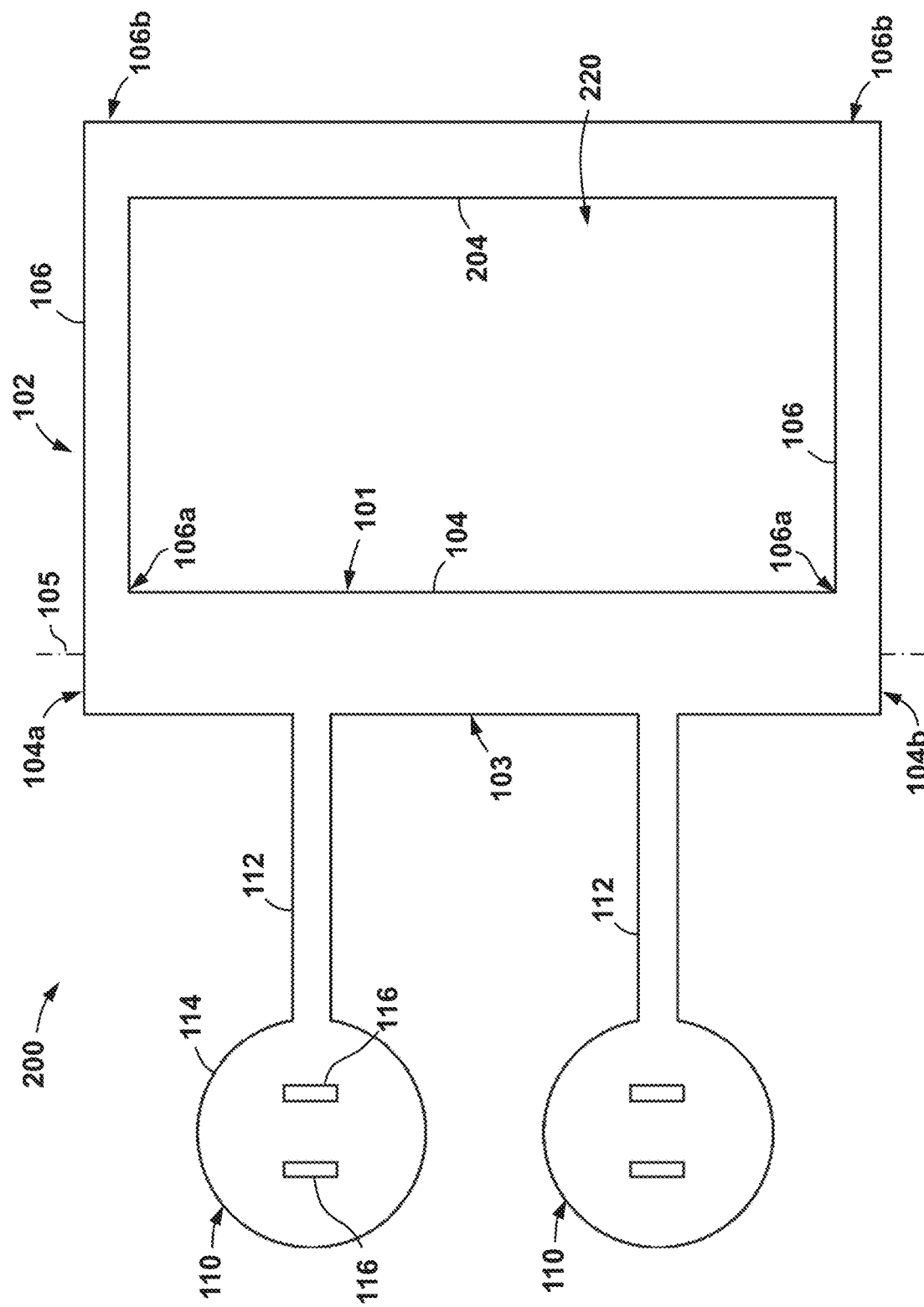
FIG. 8 is a front view of a safety plug assembly according to some embodiments.

In particular, reference is now made to FIG. 8 which shows a safety plug assembly 200 according to some embodiments. Safety plug assembly 200 includes many of the same components and features as safety plug assembly 100. Thus, features of safety plug assembly 200 that are generally shared with safety plug assembly 100 are identified with the same reference numerals, and the discussion below will focus on the features of safety plug assembly 200 that are different from that described for safety plug assembly 100.

In particular, as shown in FIG. 8, safety plug assembly 200 includes a connector 202 in place of connector 102 (see e.g., FIG. 1). In addition, safety plug assembly 200 includes a plurality of safety plugs 110 coupled to connector 202 via a plurality of arms 112 as previously described above for safety plug assembly 100. Connector 202 is generally the same as connector 102, except that connector 202 defines a closed receptacle 220 in place of the receptacle 120. Specifically, connector 202 includes first body member 104 and second body members 106 extending from first body member 104 as generally described above. In addition, connector 202 includes a third body member 204 that extends between the distal ends 106b of second body members 106 in a generally parallel direction to the axis 105. Together, the first body member 104 (particularly, first side 101 of first body member 104), the second body members 106, and the third body member 204 define a closed receptacle 220.

Referring now to FIGS. 5 and 8, during operations the electrical connectors 12 of electrical outlet 10 are received within the receptacle 220. However, because receptacle 220 is closed via the third body member 204, front plate 13 is fully removed from the electrical outlet 10 so as to allow the electrical connectors to be inserted into and through the receptacle 220 (e.g., in a direction that extends perpendicularly to the page in the view of FIG. 8). Finally, once the connector 202 is installed about the electrical connectors 12, the front plate 13 may be replaced via mounting screws 18 as previously described. Thereafter, insertion of the safety plugs 110 within electrical connectors 12 may proceed in the same manner as described above for safety plug assembly 100.

Referring now to FIGS. 9-12, a safety plug assembly 300 according to some embodiments is shown. Generally speaking, safety plug assembly 300 is similar to the safety plug assembly 100 (FIG. 1) previously described above. Thus, features of safety plug assembly 300 that are generally shared with safety plug assembly 100 are identified with the same reference numerals, and the discussion below will focus on the features of safety plug assembly 300 that are different from safety plug assembly 100.

Generally speaking, safety plug assembly 300 includes a first or front side 300a and a second or back side 300b that correspond with the front side 100a and back side 100b, respectively, of safety plug assembly 100 (see e.g., FIG. 1). In addition, safety plug assembly 300 includes a connector 302 and a plurality of safety plugs 110 coupled to connectors 302 via a plurality of arms 112. Connector 302 is similar to connector 102 and includes a first body member 104 and the pair of second body members 106 as generally described above.

Figure 9:
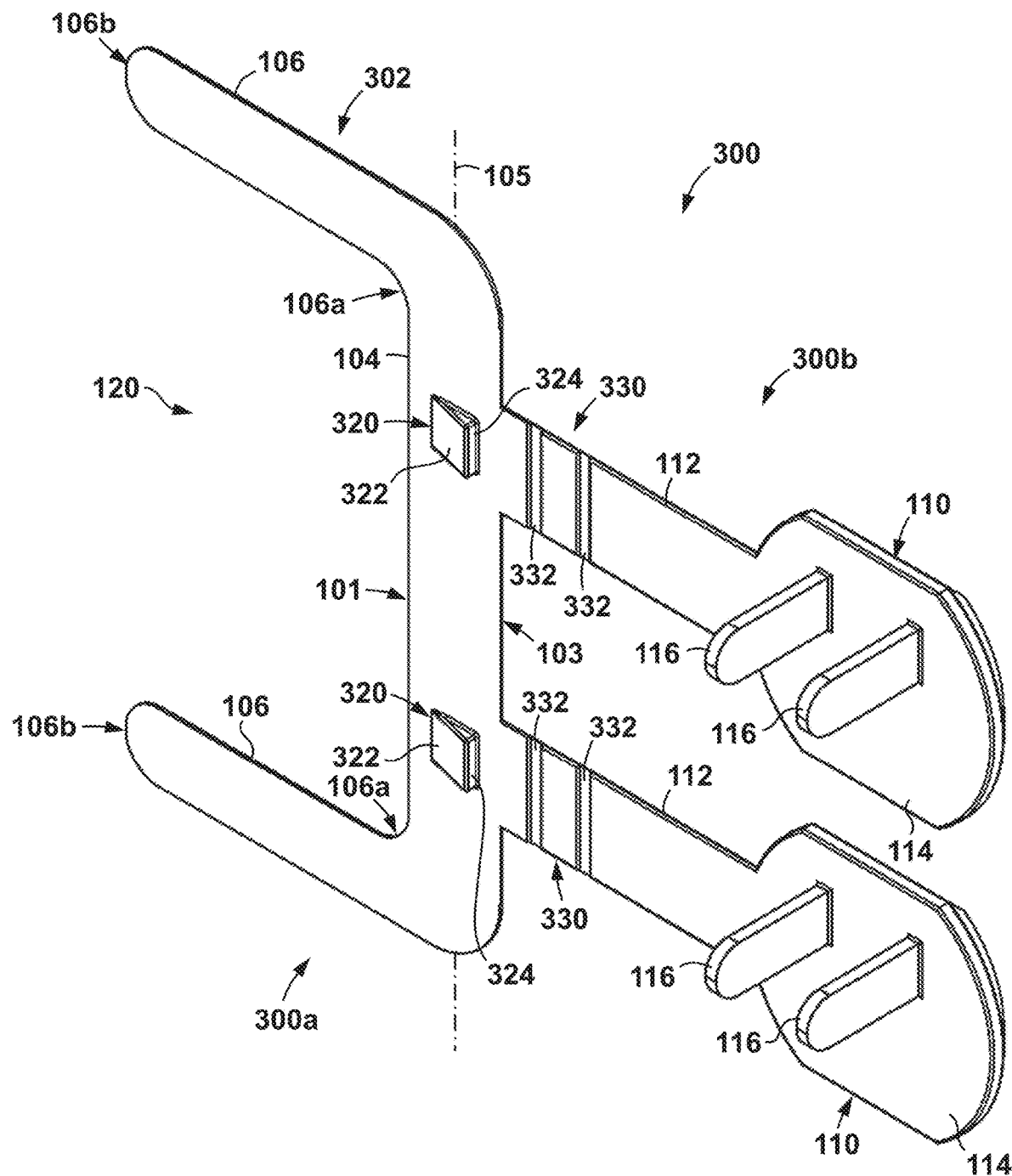
FIG. 9 is a front perspective view of a safety plug assembly according to some embodiments.
Figure 11:
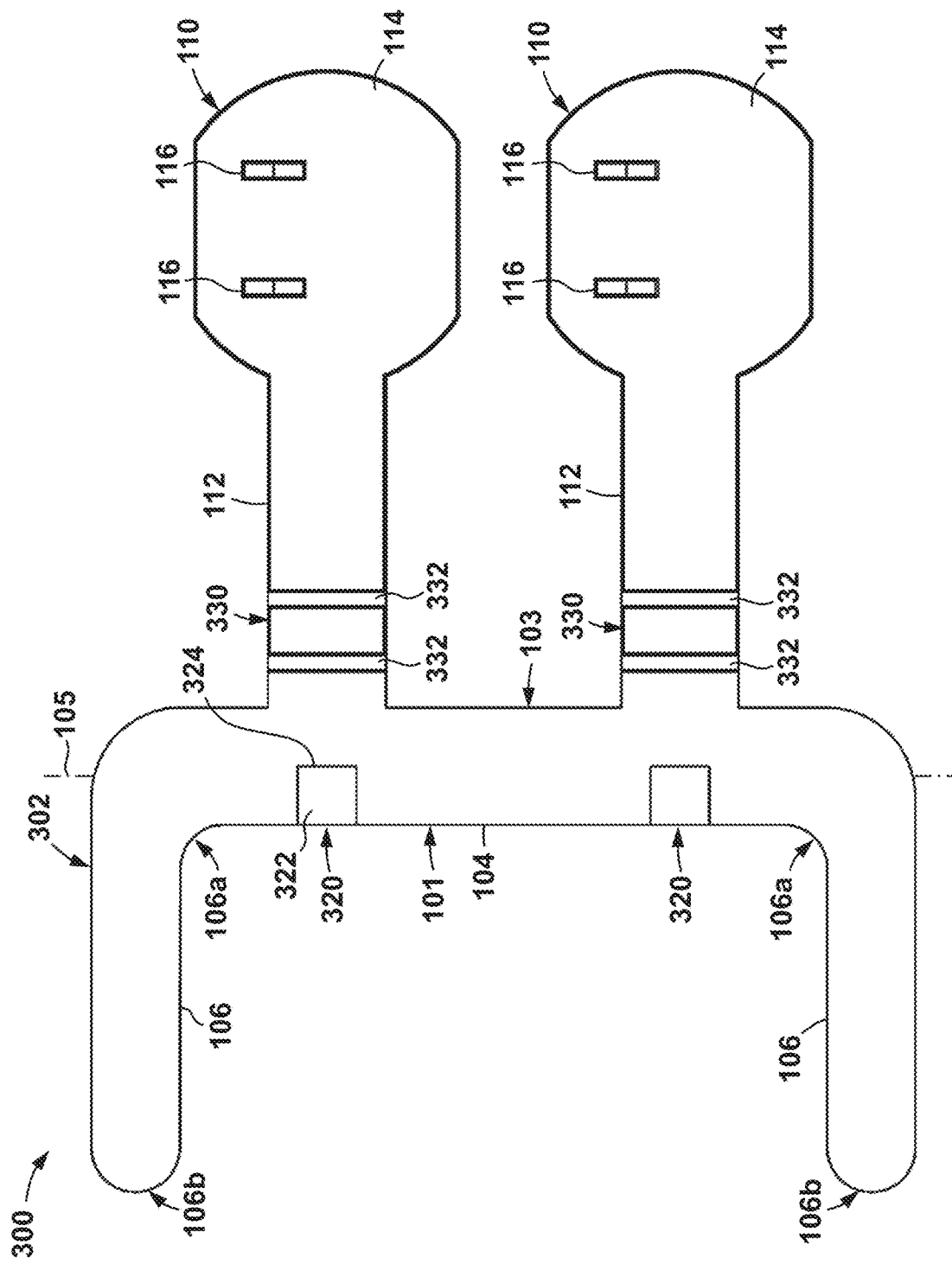
FIG. 11 is a front view of the safety plug assembly of FIG. 9 according to some embodiments.

In addition, as is best shown in FIGS. 9 and 11, connector 302 includes a plurality of catch members 320 coupled to first body member 101 along front side 300a of safety plug assembly 300. Each catch member 320 includes an abutment surface 324 that extends perpendicularly or normally relative to first body member 104. In other words, abutment surface 324 comprises a planar surface that extends in a direction that is parallel to a radius of axis 105. In addition, each catch member 320 comprises a ramped surface 322 that extends from the abutment surface 324 to the surface of first body member 101 on front side 300a of safety plug assembly 300. In particular, in some embodiments ramped surface 322 comprises a planar surface; however, in other embodiments, ramped surface 322 may comprise a curved surface (e.g., a convexly curved surface). Thus, in at least some embodiments, the catch members 320 may have a right-triangular shaped cross-section when viewed along axis 105.

Referring briefly now to FIGS. 13 and 14, during operations, catch members 320 may prevent or at least restrict the accidental withdrawal of the connector 102 from electrical outlet 10. In particular, in some embodiments, front plate 13 of electrical outlet 10 may comprise a peripheral lip 11. When installing, the safety plug assembly 300 onto the electrical outlet 10, the face plate 13 may only be loosened from the wall 15 such that connector 302 may be inserted therebetween as previously described (see e.g., the progression from FIG. 13 to FIG. 14). During these operations, the ramped surfaces 322 of catch members 320 may slide along the lip 11 until the abutment surfaces 324 are advanced past lip 11 and under front plate 13 (see e.g. FIG. 14). Thereafter, the front plate 13 may be re-secured to the electrical outlet 10 as previously described (via re-tightening the mounting screws 18 shown in FIG. 5). However, once font plate 13 is compressed against connector 302 along front side 300a of safety plug assembly 300, withdrawal of the connector 302 from behind the front plate 13 (e.g., without loosening the plate 13 from support surface 15 and electrical outlet 10 as previously described) may be prevented by engagement of the abutment surfaces 324 of catch members 320 and lip 11 of front plate 13.

Referring again to FIGS. 9-12, arms 112 of safety plug assembly 300 may be generally the similar to that previously described above; however, in this embodiment, arms 112 may additionally include a hinge assembly 330. As will be described in more detail below, the hinge assembly 300 may allow bending or folding of the corresponding arm 112 during operations so as to enhance and facilitate engagement of the safety plugs 110 with the electrical connectors of an electrical outlet during operations (see e.g., electrical connectors 12 of electrical outlet 10 in FIG. 8, previously described above).

Figure 10:
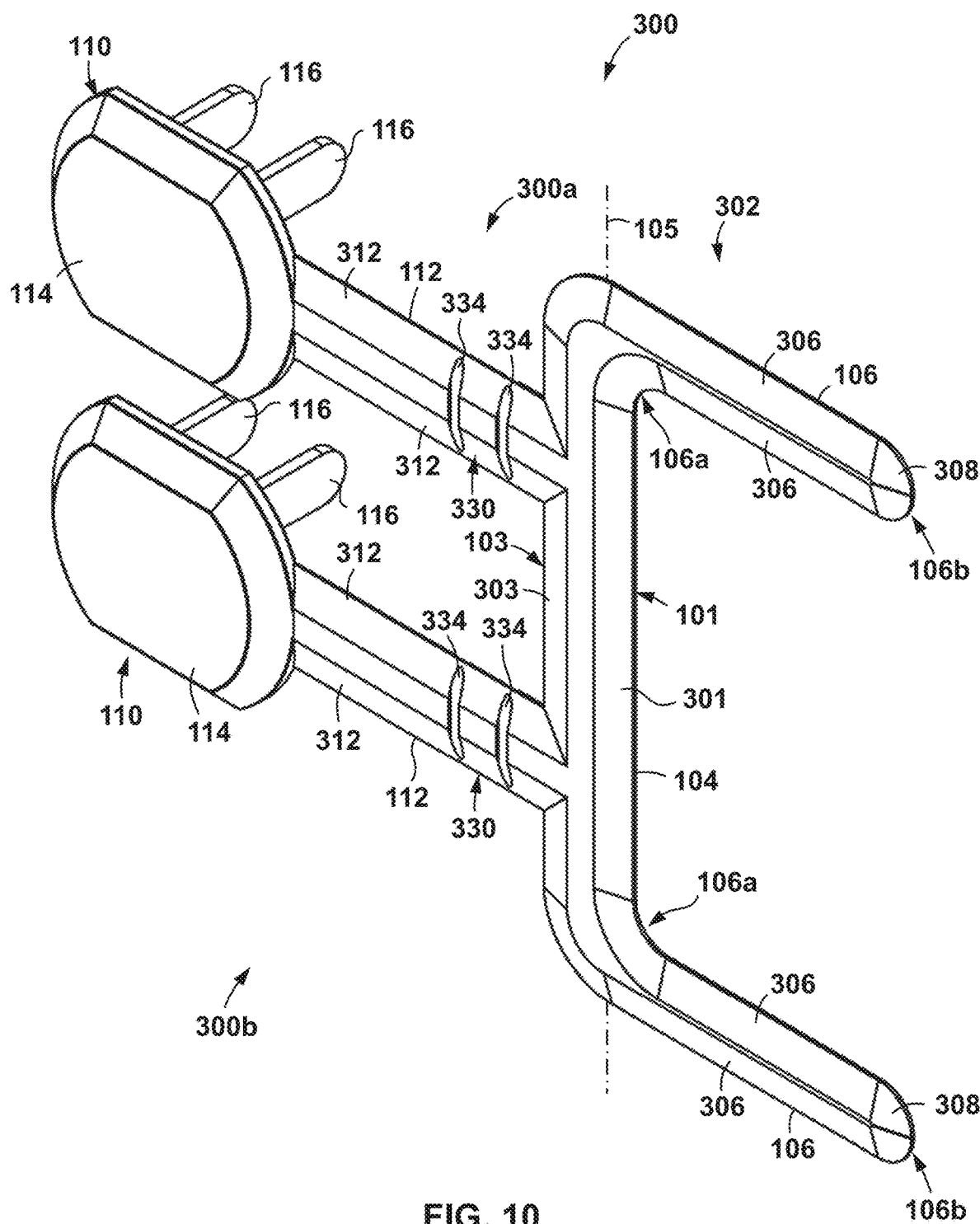
FIG. 10 is a back perspective view of the safety plug assembly of FIG. 9 according to some embodiments.
Figure 12:
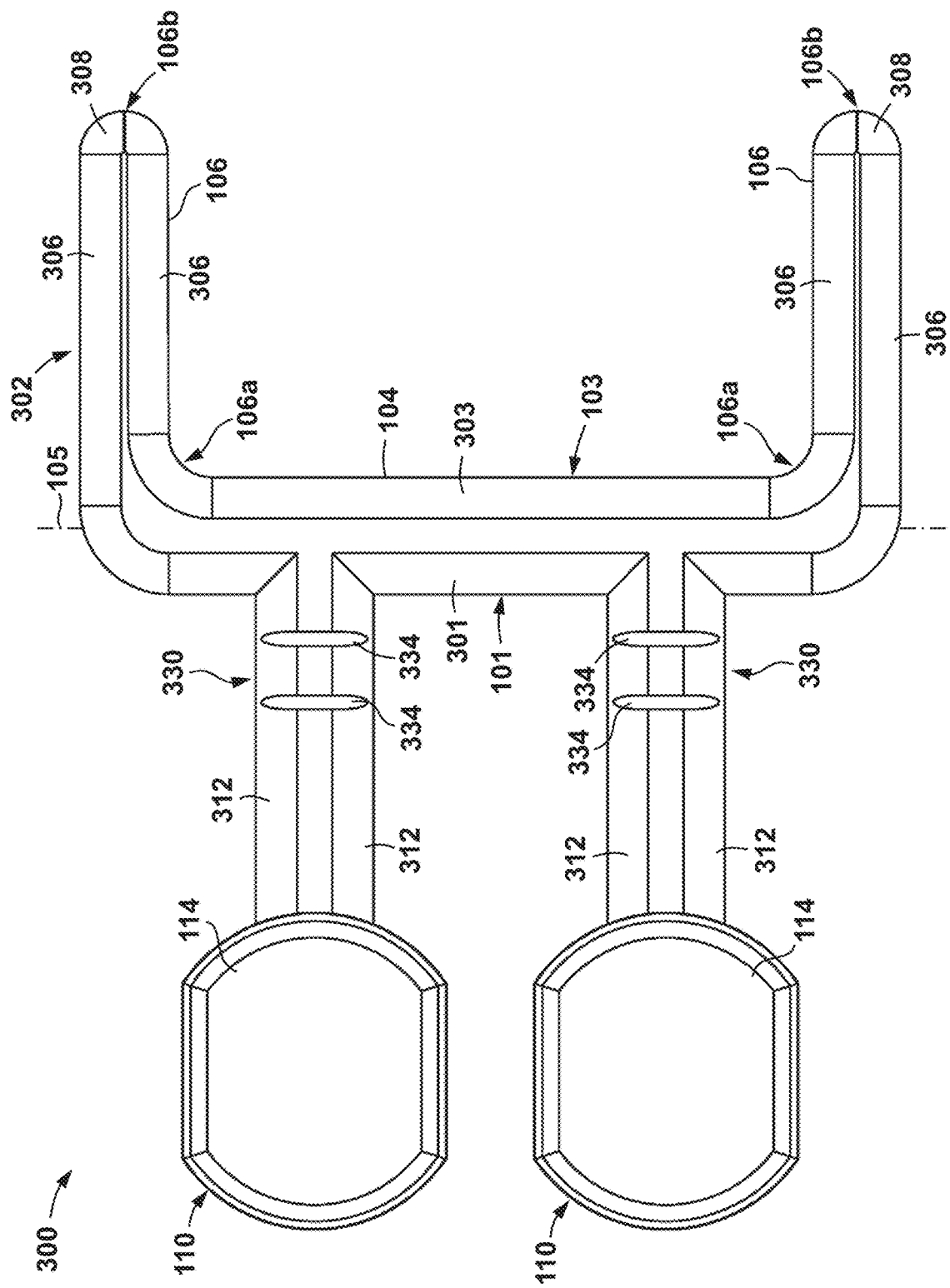
FIG. 12 is a back view of the safety plug assembly of FIG. 9 according to some embodiments.

In this embodiment, hinge assembly 330 comprises a plurality of recesses or notches 332, 334 that generally reduce a thickness of the arm 112 so as to facilitate bending or folding of the arm 112 at the hinge assemblies 330 during operations. In particular, in this embodiments, arms 112 may each include one or more first notches 332 along front side 300a of safety plug assembly 300 (FIGS. 9 and 11) and one or more second notches 334 along back side 300b of safety plug assembly 300 (FIGS. 10 and 12). As best shown in FIGS. 13 and 14, the first notches 332 may be aligned with the second notches 334 along the length of arms 112 such that the thickness of the arms 112 is reduced both along first side 300a and second side 300b at the aligned notches 332, 334.

Thus, during operations, when one of the safety plugs 110 is maneuvered to engage with an electrical connector on an electrical outlet as described above, the corresponding arm 112 may bend or fold at the aligned notches 332, 334 so that a general curvature along the arm 112 is reduced. Without being limited to this or any other theory, by reducing a curvature of the arms 112 when the safety plugs 110 are inserted with the electrical connectors of a corresponding electrical outlet (see e.g., electrical connectors 12 and electrical outlet 10 in FIG. 8), may reduce the distance that arms 112 may project outward from the electrical outlet and/or the underlying support surface (see e.g., wall 15 in FIG. 8), so that there is a reduced chance that someone may accidentally engage with the arms 112 and thereby unintentionally withdrawal or disengage safety plug 110 from the electrical connector 12.

It should be appreciated that in some embodiments, hinge assembly 330 may comprise alternative structures or components (e.g., other than or in addition to notches 332, 334) for facilitating the bending or folding of arms 112 during operations. For instance, in some embodiments, hinge assemblies 330 may comprise a pinned connection.

Referring now to FIGS. 10 and 12, the connector 302 and arms 112 may include a plurality of tapered edges on back side 300b of safety plug assembly 300. In particular, second body members 106 may each include a leading tapered edge 308 at distal ends 106b and a pair of side tapered edges 306 extending between ends 106a, 106b. In addition, first body member 104 may include a first tapered edge 301 along first side 101, and a second tapered edge 303 along second side 103. Further, arms 112 may each include a pair of tapered edges 312.

Referring now to FIGS. 10 and 12-14, during operations, as connector 302 is inserted between the front plate 13 and wall 15, the tapered edges, and particularly the leading tapered edges 308 on distal ends 106b of second body members 106 as well as the first tapered edge 301 along first side 101 of first body member 104 may prevent connector 302 from being caught or engaged on surfaces or components of electrical outlet 10 that are disposed under front cover 13. Rather, the angle of the tapered edges (e.g., again particularly tapered edges 308, 301) may allow connector 302 to generally deflect away from obstructions so as to allow the general insertion of connector 302 behind front plate 13 to continue.

Figure 15:
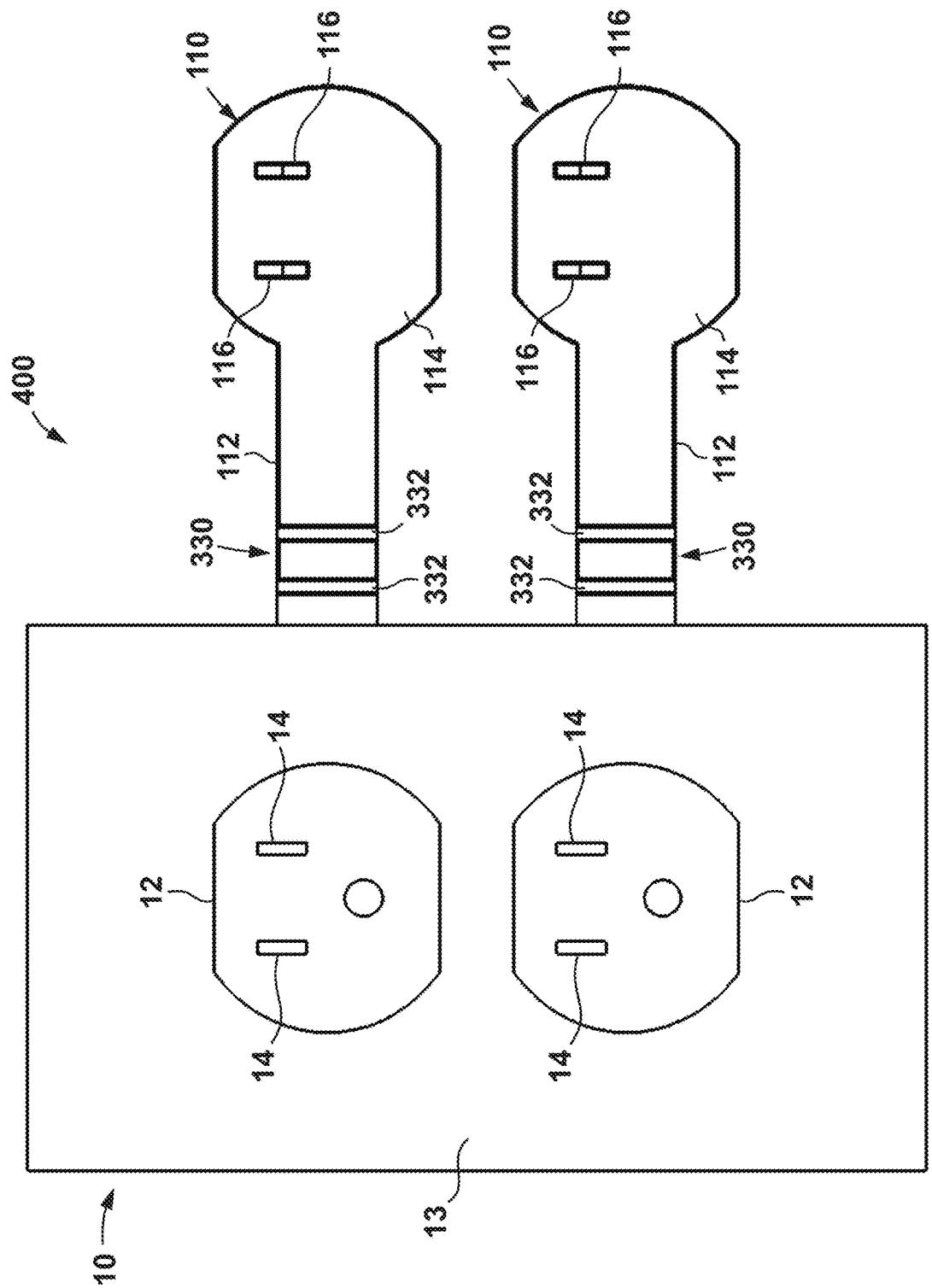
FIG. 15 is a front view of a safety plug assembly according to some embodiments.

In some embodiments, a safety plug assembly (e.g., safety plug assembly 100, 300) may be integrated with the front cover the electrical outlet (e.g., front cover 13). For instance, reference is now made to FIG. 15, wherein a safety plug assembly 400 according to some embodiments is shown. Safety plug assembly 400 may share several features with safety plug assemblies 100, 300. As a result, features of safety plug assembly 400 that are shared with safety plug assemblies 100, 300 may be identified with the same reference numerals and the discussion below will focus on the features of safety plug assembly 400 that are different from safety plug assemblies 100, 300.

In particular, safety plug assembly 400 does not include a connector 102, 302 (see e.g., FIGS. 1 and 9). Rather, the arms 112 and safety plugs 110 are directly engaged with front cover 13 of electrical outlet 10. During operations, the safety plugs 110 are maneuvered so as to selectively engage the safety plugs 110 with the electrical connectors 12 of electrical outlet 10 in the same manner as previously described except that no connector 102, 302 is disposed between front cover and support surface 15, and arms 112 instead are deformed (e.g., folded, rolled) directly about front cover 13.

Figure 16:
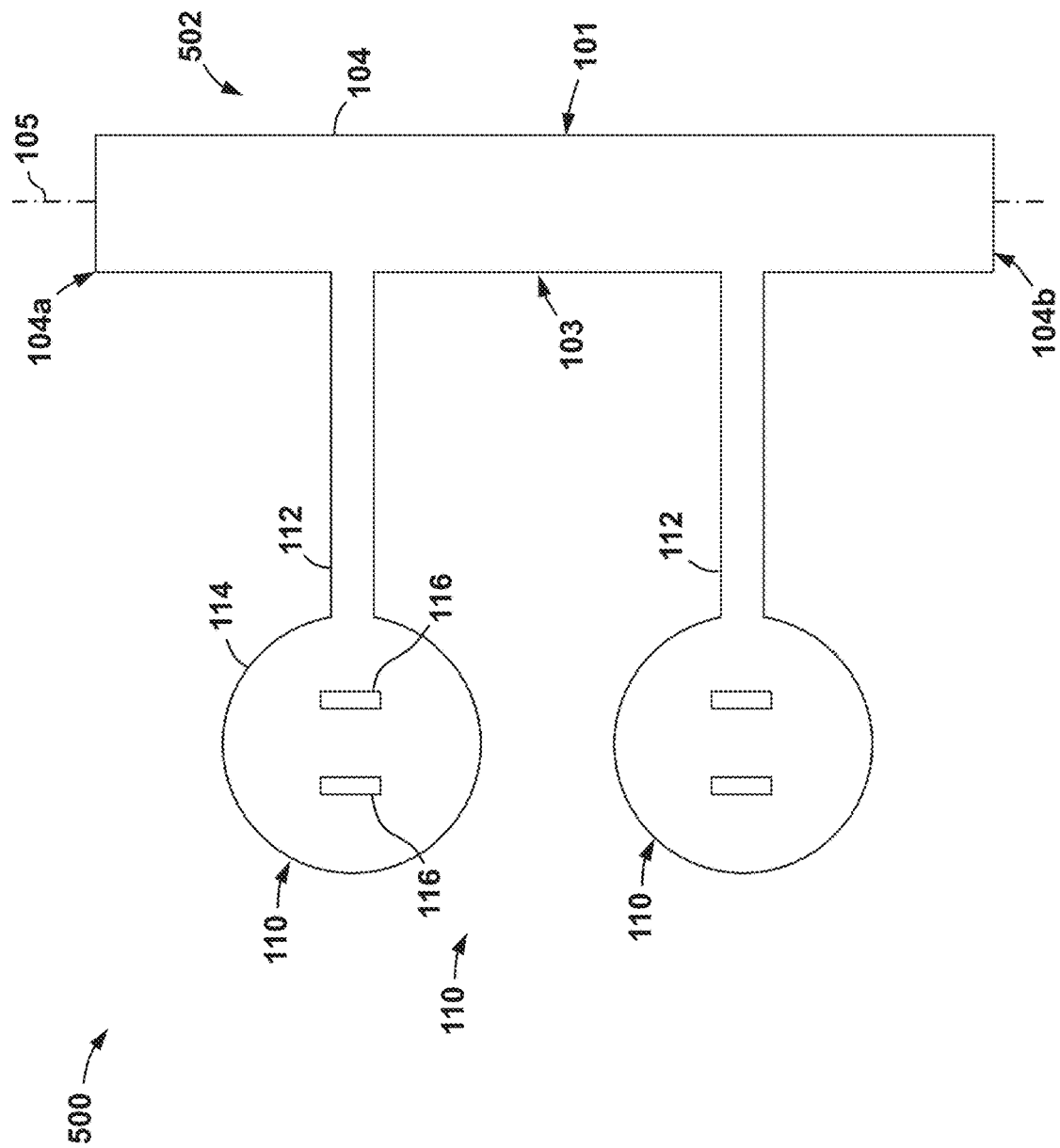
FIG. 16 is a front view of a safety plug assembly according to some embodiments.

In some embodiments, a safety plug assembly (e.g., safety plug assembly 100, 300) may include a connector 102, 302 that includes the first body member 104, but omits the second body members 106 (see e.g., FIG. 1). For instance, reference is now made to FIG. 16, wherein a safety plug assembly 500 according to some embodiments is shown. Safety plug assembly 500 may share several features with safety plug assemblies 100, 300. As a result, features of safety plug assembly 500 that are shared with safety plug assemblies 100, 300 may be identified with the same reference numerals and the discussion below will focus on the features of safety plug assembly 400 that are different from safety plug assemblies 100, 300.

In particular, safety plug assembly 500 includes a connector 502 that includes a first body member 104 but omits the second body members 106. During operations, the first body member 104 of connector 502 may be inserted behind the front plate of an electrical outlet (e.g., front plate 13) as previously described (see e.g., FIGS. 4 and 5 and the associated discussion above). However, as the first body member 104 is inserted behind the front plate 13, the outlet connectors of the electrical outlet (e.g., outlet connectors 12) are not received within a receptacle formed by the body 502 (e.g., receptacle 120 shown in FIG. 1) as a result of the omission of second body members 106. It should be appreciated that the connector 502 may be inserted behind the front plate of an electrical outlet without completely removing mounting screws (e.g., mounting screws 18) and therefore without entirely removing the front plate from the electrical outlet as generally described above for safety plug assemblies 100, 300.

Figure 17:
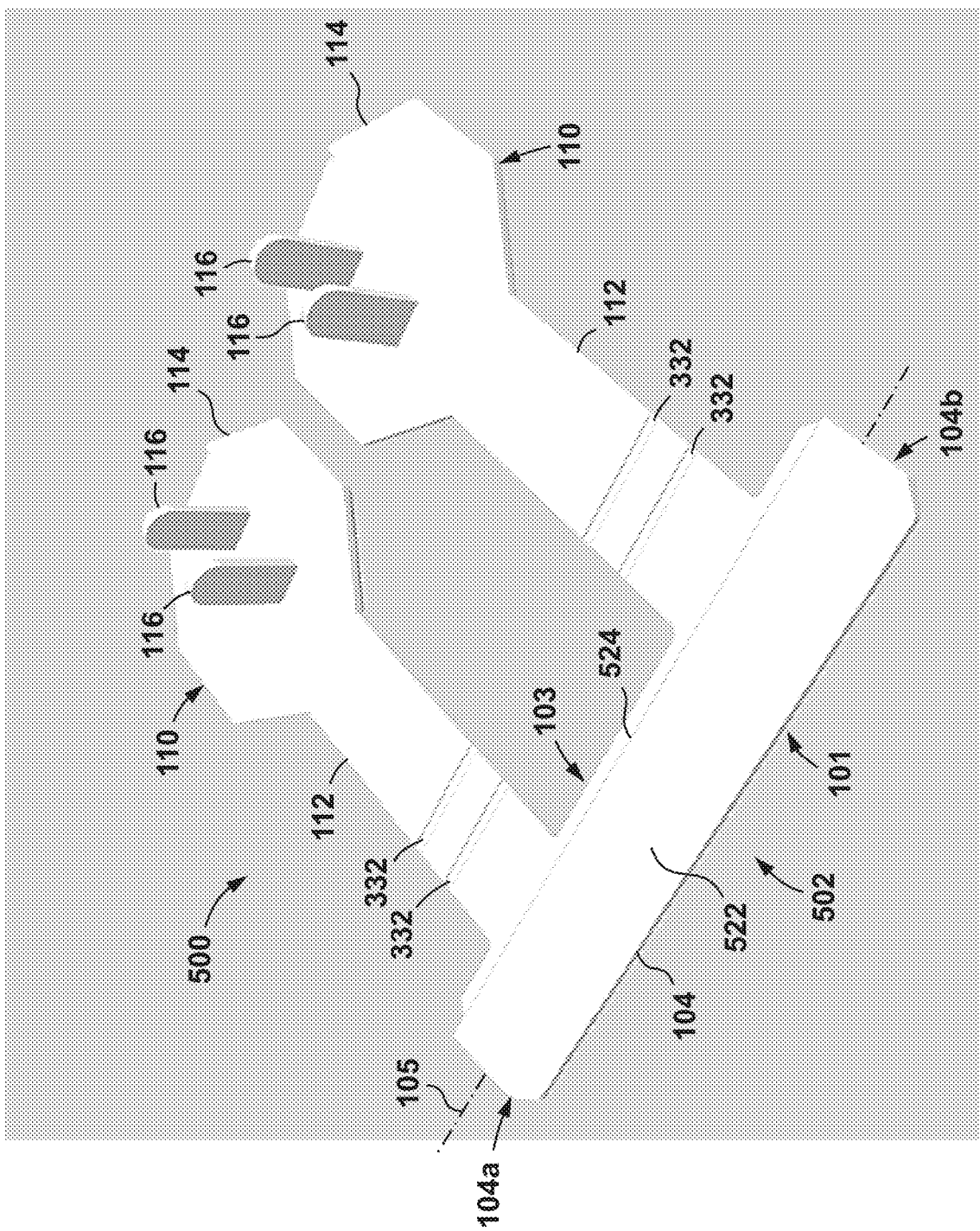
FIG. 17 is a perspective view of a safety plug assembly according to some embodiments.
Figure 18:
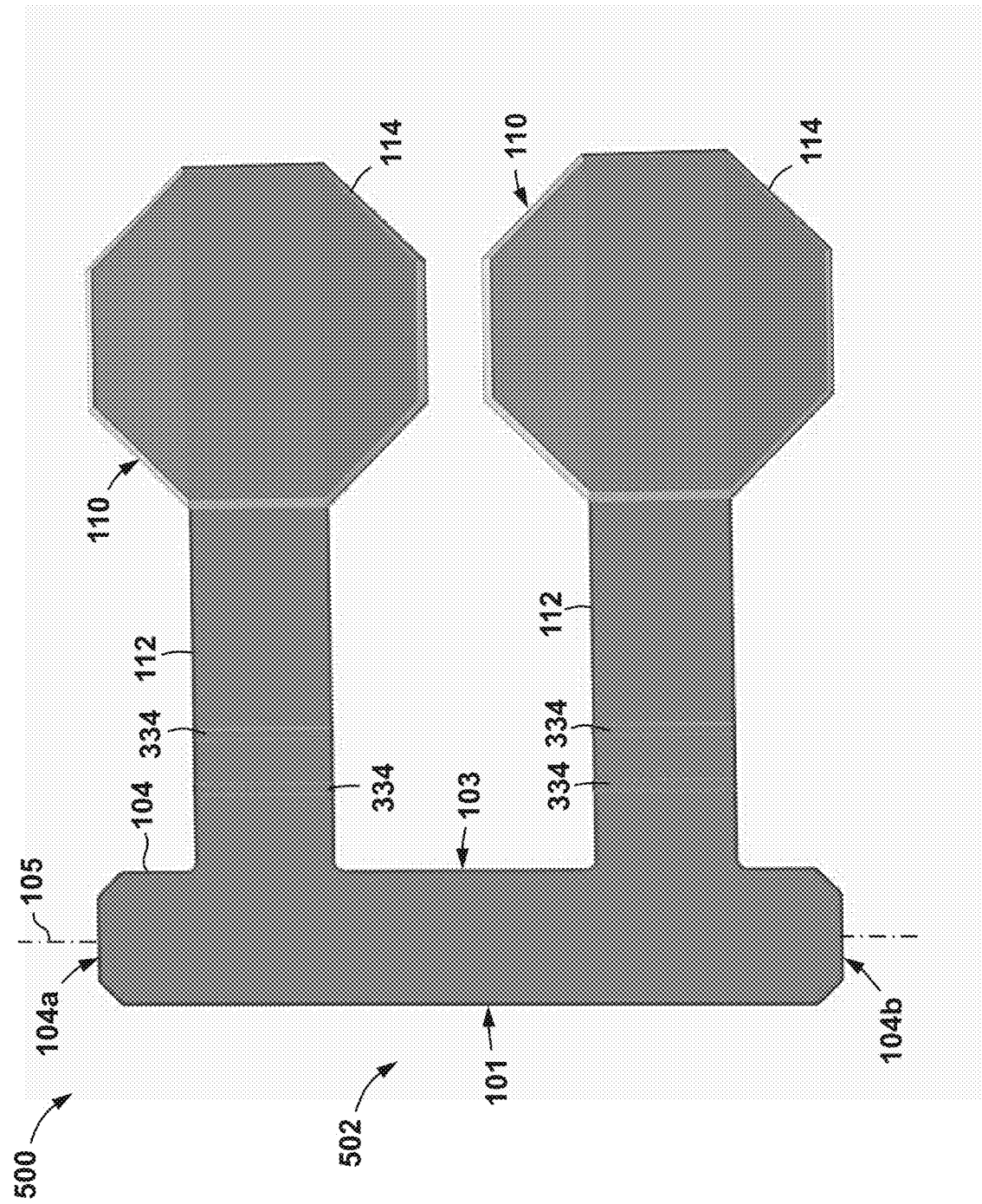
FIG. 18 is a back view of the safety plug assembly of FIG. 17 according to some embodiments.
Figure 19:
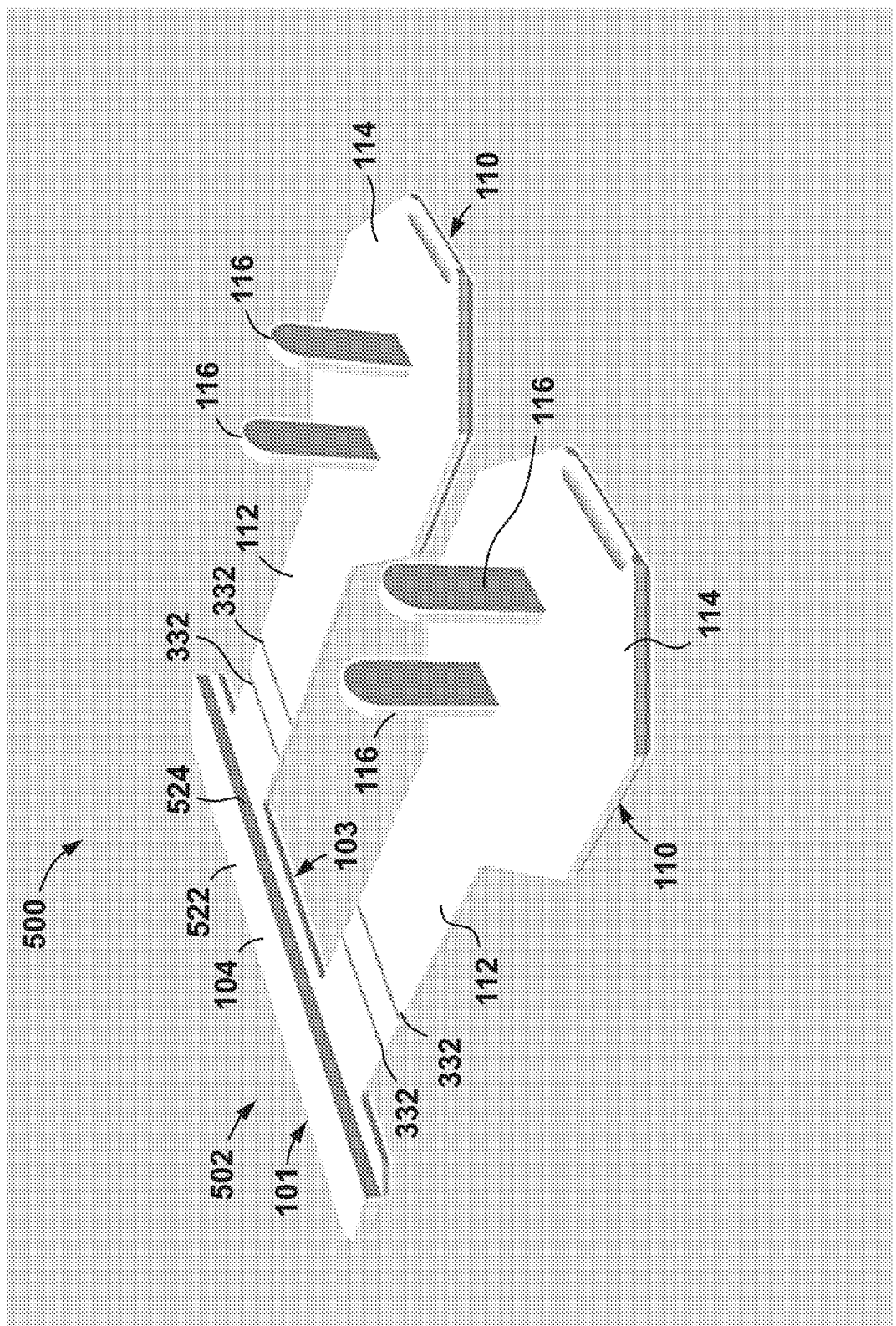
FIG. 19 is another perspective view of the safety plug assembly of FIG. 17 according to some embodiments.

Referring now to FIGS. 17-19, in some embodiments, the body 502 may include an abutment surface 524 extends perpendicularly or normally relative to first body member 104. In some embodiments (e.g., such as in the embodiment of FIGS. 17-19), the abutment surface 524 may comprise a single abutment surface 524 that extends axially along the first body member 104 with respect to axis 105. In some embodiments, the abutment surface 524 may extend along a majority of axial length of first body member 104 with respect to axis 105 between ends 104a, 104b, including the entire axial length of the first body member 104. In addition, body 502 includes ramped surface 522 that extends from first side 101 of first body member 104 to abutment surface 524, such that a thickness of the first body member 104 tapers or decreases when moving along the ramped surface 522 from the abutment surface 524 toward the first side 101.

During operations, the abutment surface 524 may engage with a peripheral lip (e.g., peripheral lip 11 shown in FIGS. 13 and 14) of the front plate of an electrical outlet so as to prevent withdrawal of the connector 502 from behind the front plate without loosening the mounting screws thereof (e.g., mounting screws 18) in generally the same manner as described above for abutment surfaces 324 (see e.g., FIGS. 13 and 14).

Referring still to FIGS. 17-19, in some embodiments, the arms 112 may include recesses or notches 332, 334 that are generally the same as the notches 332, 334 of the safety plug assembly 300, previously described above. Thus, during operations, the arms 112 may bend or fold at the aligned notches 332, 334 so that a general curvature along the arm 112 is reduced as previously described.

Embodiments disclosed herein include safety plug assemblies (e.g., safety plug assembles 100, 200, 300, 400, 500) for electrical outlets that allow the safety plugs (e.g., safety plugs 110, 210) to remain coupled to the electrical outlet (e.g., via the face plate, the adjacent wall, etc.) even when the safety plug is not inserted within the electrical connector of the outlet. Thus, through use of the embodiments disclosed herein, the risk that a safety plug will not be reinstalled into an electrical outlet following use thereof is reduced.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A safety plug assembly, comprising:
   a connector configured to be inserted behind a front plate of an electrical outlet, wherein the connector comprises a first body member including:
   a central axis; and
   a first side and a second side radially opposite the first side with respect to the central axis,
   wherein the first body member includes a ramped surface that extends from the first side to an abutment surface, and
   wherein a thickness of the first body member tapers when moving along the ramped surface from the abutment surface toward the first side; and
   a safety plug coupled to the connector, wherein the safety plug comprises a plug member that is configured to be inserted within a contact opening of the electrical outlet.

2. The safety plug assembly of claim 1, comprising an arm connecting the safety plug to the second side of the of the first body member.

3. The safety plug assembly of claim 2, wherein the arm comprises a hinge assembly, wherein the arm is configured to fold at the hinge assembly when the plug member of the safety plug is inserted within the contact opening of the electrical outlet.

4. The safety plug assembly of claim 3, wherein the hinge assembly comprises a notch extending into the arm.

5. The safety plug assembly of claim 2, wherein the connector comprises:
   a pair of second body members extending radially from the first side, wherein the pair of second body members are axially spaced along the central axis; and
   a receptacle defined by the pair of second body members and the first body member, wherein the receptacle is configured to receive a plurality of outlet connectors along a radial direction with respect to the central axis.

6. The safety plug assembly of claim 5, wherein the abutment surface extends in a direction that is parallel to a radius of the central axis.

7. The safety plug assembly of claim 5, wherein the connector, the safety plug, and the arm comprise a single piece, monolithic body that is constructed from a dielectric material.

8. A safety plug assembly, comprising:
   a connector comprising a central axis, a first body member extending along the central axis, a second body member extending radially from the central axis from a fixed end connected to the first body member to a free end opposite the fixed end, and a receptacle disposed on a first side of the central axis and at least partially defined by the first body member and the second body member, wherein the connector is configured to be inserted behind a front plate of an electrical outlet such that an outlet connector of the electrical outlet is received within the receptacle along a radial direction with respect to the central axis;
   an arm extending from the connector on a second side of the central axis that is opposite the first side; and
   a safety plug coupled to the arm, wherein the safety plug includes a plug member that is configured to be inserted within a contact opening of the outlet connector.

9. The safety plug assembly of claim 8, wherein the connector comprises:
   a pair of the second body members extending radially from the first body member on the first side of the central axis, wherein the pair of second body members are axially spaced along the central axis, and wherein the receptacle is defined by the first body member and the pair of second body members.

10. The safety plug assembly of claim 9, wherein the first body member comprises a ramped surface that extends from the first side to an abutment surface, wherein a thickness of the first body member tapers when moving along the ramped surface from the abutment surface toward the first side, and wherein the abutment surface extends in a direction that is parallel to a radius of the central axis.

11. The safety plug assembly of claim 10, wherein the arm comprises a hinge assembly, and wherein the arm is configured to fold at the hinge assembly when the plug member is inserted within the contact opening of the outlet connector.

12. The safety plug assembly of claim 11, wherein the hinge assembly comprises a notch extending into the arm.

13. The safety plug assembly of claim 9, wherein the pair of second body members each comprise a proximal end at the first body member and a distal end spaced from the first body member, wherein a thickness of the second body members tapers at the distal end.

14. The safety plug assembly of claim 9, wherein the connector, the safety plug, and the arm comprise a single piece, monolithic body that is constructed from a dielectric material.

15. The safety plug assembly of claim 9, comprising a head coupled to the arm,
wherein the head comprises an aperture;
wherein the plug member of the safety plug is inserted through the aperture.

16. A method, comprising:
(a) loosening a mounting screw extending through the front plate of an electrical outlet that is installed along a surface such that the front plate is not fully removed from the electrical outlet;
(b) inserting a connector of a safety plug assembly between the surface and the front plate after (a);
(c) receiving an outlet connector of an electrical outlet into receptacle of the connector during (b);
(d) tightening the mounting screw of the front plate;
(e) compressing the connector with the front plate during (d); and
(f) inserting a safety plug into a contact opening of the outlet connector after (d), wherein the safety plug is coupled to an arm that extends from the connector.

17. The method of claim 16, comprising deforming the arm during (f).

18. The method of claim 16, comprising:
(g) removing the safety plug from the outlet connector; and
(h) suspending the safety plug alongside the electrical outlet with the arm after (g).

19. The method of claim 18, comprising:
sliding a lip of the front plate along an ramped surface of a catch member of the connector during (b).

* * * * *